United States Patent
Chen

(10) Patent No.: US 9,210,393 B2
(45) Date of Patent: Dec. 8, 2015

(54) MULTIMEDIA OBJECT CORRELATION USING GROUP LABEL

(75) Inventor: Xiaohua Chen, Beijing (CN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 13/701,833

(22) PCT Filed: May 26, 2011

(86) PCT No.: PCT/CN2011/074690
§ 371 (c)(1),
(2), (4) Date: Dec. 4, 2012

(87) PCT Pub. No.: WO2012/159271
PCT Pub. Date: Nov. 29, 2012

(65) Prior Publication Data
US 2013/0077938 A1 Mar. 28, 2013

(51) Int. Cl.
*H04N 9/79* (2006.01)
*H04N 21/258* (2011.01)
*H04N 21/274* (2011.01)
*H04N 21/414* (2011.01)
*H04N 21/422* (2011.01)
*H04N 21/4223* (2011.01)
*H04N 21/658* (2011.01)

(52) U.S. Cl.
CPC ........... *H04N 9/79* (2013.01); *H04N 21/25866* (2013.01); *H04N 21/274* (2013.01); *H04N 21/41407* (2013.01); *H04N 21/4223* (2013.01); *H04N 21/42202* (2013.01); *H04N 21/6582* (2013.01)

(58) Field of Classification Search
None
See application file for complete search history.

(56) References Cited

U.S. PATENT DOCUMENTS

| | | | |
|---|---|---|---|
| 2002/0001036 A1* | 1/2002 | Kinjo | 348/231 |
| 2005/0054447 A1* | 3/2005 | Hiroyama et al. | 463/42 |
| 2005/0198130 A1* | 9/2005 | Bosloy et al. | 709/204 |
| 2005/0234958 A1* | 10/2005 | Sipusic et al. | 707/102 |
| 2006/0075023 A1* | 4/2006 | Tenereillo | 709/205 |
| 2010/0103463 A1* | 4/2010 | Joshi et al. | 358/1.16 |
| 2010/0274816 A1* | 10/2010 | Guzik | 707/802 |
| 2011/0109726 A1* | 5/2011 | Hwang et al. | 348/47 |
| 2011/0145325 A1* | 6/2011 | Hampel | 709/203 |

FOREIGN PATENT DOCUMENTS

| | | |
|---|---|---|
| CN | 85102437 A | 12/1985 |
| CN | 1666513 A | 9/2005 |
| CN | 1801891 A | 7/2006 |

OTHER PUBLICATIONS

Notification of Transmittal of the International Search Report and the Written Opinion of the International Searching Authority, Mar. 8, 2012.
Todd Vierling, "Synchronized Multimedia Integration Language", Jun. 7, 2010 http://en.wikipedia.org/w/index.php?oldid=366579516.
Klara Nahrstedt et al., "Resource Management in Multimedia Networked Systems", University of Pennsylvania, Department of Computer & Information Science, Technical Reports, May 1994.

* cited by examiner

*Primary Examiner* — Hung Dang
*Assistant Examiner* — Sunghyoun Park
(74) *Attorney, Agent, or Firm* — Ren-Sheng International

(57) ABSTRACT

In accordance with embodiments of the present disclosure, a process for correlating a plurality of multimedia objects with a plurality of recording devices is described. The process may be implemented to generate a group label for a recording group, wherein the group label corresponds to a specific time and a specific location for the recording group. The process may include receiving, from a recording device, a join request seeking to join the recording group. The process may also include, upon approval of the join request, transmitting the group label to the recording device, wherein the group label is used by the recording device during generating of a multimedia object.

20 Claims, 6 Drawing Sheets

MULTIMEDIA OBJECT CORRELATION USING GROUP LABEL

CROSS-REFERENCE TO RELATED APPLICATIONS

The present application is a U.S. National Stage filing under 35 U.S.C. § 371 of International Application PCT/CN2011/074690, filed on May 26, 2011 and entitled "MULTIMEDIA OBJECT CORRELATION USING GROUP LABEL." The International Application, including any appendices or attachments thereof, is incorporated by reference herein in its entirety.

TECHNICAL FIELD

The present disclosure relates generally to multimedia related technologies and more specifically to techniques for correlating multimedia objects.

BACKGROUND

Multimedia capturing (recording) devices are increasingly popular in recent years. Multiple recording devices may record the same subject matter at the same time and at the same event (e.g., accidents, parties, performances, and sporting events.) The contents recorded by these recording devices may have temporal and/or spatial correlations. That is, the recorded contents may be related in time since they are created at proximately the same time. In addition, the recorded contents may also be related in space since the recording devices may record the same subject matter in the nearby environment. Thus, the recorded contents of a subject matter from the different recording devices may contain similar information, which may together provide a broader perspective of the subject matter.

Although the contents recorded by these recording devices are similar or related, the obtained multimedia objects (e.g., audio, video, and images) are often isolated from each others. The temporal and spatial correlations existed among these recorded contents are hard to maintain across the different recording devices, and may be lost once the recorded contents are subsequently distributed. Without these correlations, it would be hard to search for the related recorded contents, and it would limit a user's comprehensive understanding of the recorded contents.

SUMMARY

In accordance with at feast some embodiments of the present disclosure, a method for correlating multimedia objects with a plurality of recording devices is presented. The method may include generating a group label for a recording group, wherein the group label corresponds to a specific time and a specific location for the recording group. The method may further include receiving, from a recording device, a join request seeking to join the recording group; and upon approval of the join request, transmitting the group label to the recording device, wherein the group label is used by the recording device during generating of a multimedia object.

In accordance with other embodiments of the present disclosure, a method for correlating multimedia objects with a plurality of recording devices is presented. The method may include establishing, by a first recording device, a first network connection with a second recording device. The method may further include transmitting, from the first recording device, a first join request to the second recording device via the first network connection seeking to join a first recording group; receiving, by the first recording device, a first group label from the second recording device, wherein the first group label identifies the first recording group and corresponds to a specific time and a specific location associated with the second recording device; and generating, by the first recording device, a multimedia object using the first group label.

In accordance with at least some further embodiments of the present disclosure, a machine-readable medium may contain a set of instructions which, when executed by a processor, cause the processor to perform a method for correlating multimedia objects with a plurality of recording devices is presented. The method may include generating a group label for a recording group, wherein the group label corresponds to a specific time and a specific location for the recording group. The method may further include receiving, from a recording device, a join request seeking to join the recording group; and upon approval of the join request, transmitting the group label to the recording device, wherein the group label is used by the recording device during generating of a multimedia object.

In accordance with at least some further embodiments of the present disclosure, a machine-readable medium may contain a set of instructions which, when executed by a processor of a first recording device, cause the processor to perform a method for correlating multimedia objects with a plurality of recording devices is presented. The method may include establishing a first network connection with a second recording device. The method may further include transmitting a first join request to the second recording device via the first network connection seeking to join a first recording group; receiving a first group label from the second recording device, wherein the first group label identifies the first recording group and corresponds to a specific time and a specific location associated with the second recording device; and generating a multimedia object using the first group label.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
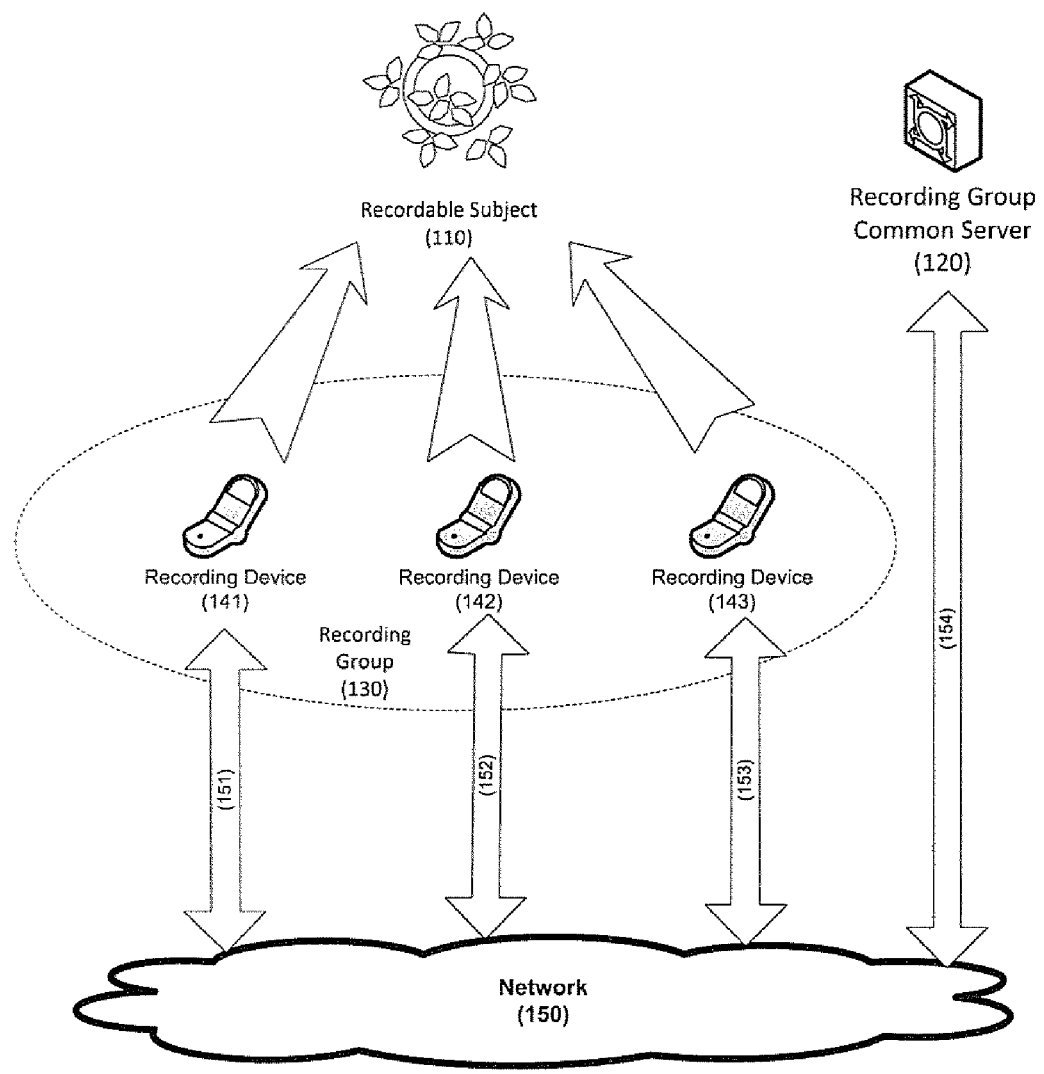
FIG. 1 shows a block diagram of an operational environment in which illustrative embodiments of a system may operate to correlate multiple multimedia objects created by various recording devices.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

This disclosure is drawn, inter alia, to methods, apparatus, computer programs and systems related to the correlating of multiple multimedia objects generated by various recording devices. When the recording devices are adjacent among each other and recording at the same or similar time, the embodiments of the present disclosure may allow spatial and temporal correlations of the multimedia objects generated by the recording devices. The correlations of the multimedia objects may be achieved through one or more recording groups having corresponding group labels. Each recording device may belong to the one or more recording groups. Each group label may correspond to a specific time and a specific location for a recording group. The group labels may uniquely identify the recording groups the recording device is a member of, and may be stored with the multimedia objects. The multimedia objects that contain the same group label are correlated among each other, and may be easily searched and retrieved subsequently using the specific group label.

Throughout the disclosure, the term "recording group" may refer to a group of recording devices that are configured to correlate the multimedia objects generated by them. The term "group label" may broadly refer to a data structure that is associated with a specific recording group, and can uniquely identify the corresponding recording group. The group label for a specific recording group is shared by the recording devices belonging to the specific recording group, and can be stored with the multimedia objects created by the recording devices, or stored separately. The multimedia objects that have the same group label are correlated with temporal and spatial associations.

FIG. 1 shows a block diagram of an operational environment in which illustrative embodiments of a system may operate to correlate multiple multimedia objects created by various recording devices. As depicted in FIG. 1, one or more recording devices 141, 142 and 143 may be configured to record a recordable subject 110. The recordable subject 110 may be an object or an event that is located at a specific geographic location, and can be captured by a recording device. For example, the recordable subject 110 may be a tourist attraction, a performance, or a sporting event.

In some embodiments, the recording devices 141, 142, and 143 may be devices that have multimedia recording modules to capture photographs, audios, and/or videos of the recordable subject 110, and store the captured information as multimedia objects. The generated multimedia objects may contain a combination of audio, video, text, image and other formatted data, in analog or digital format. The recording devices 141, 142, or 143 may be, without limitation, a film or digital camera, camcorder, cell phone, smart-phone, Personal Digital Assistant (PDA), personal computer, netbook, and other appliance capable of generating multimedia objects. The recording devices 141, 142, and 143 may also be network devices that support various network communication means such as, without limitation, WI-FI, BLUETOOTH, Global System for Mobile communication (GSM), Code Division Multiple Access (CDMA), or Time Division Multiple Access (TDMA).

In some embodiments, the recording devices 141, 142, and 143 may be configured to operate at or near the recordable subject 110 during a same period of time. In this case, the recording devices 141, 142, and 143 may determine to form a recording group 130 to correlate their created multimedia objects. The recording group 130 may utilize a network 150 that is dynamically established among these recording devices 141, 142, and 143.

In some embodiments, the network 150 may be a network that uses wireless technologies to transmit network messages among the participants of the network 150. Specifically, the network 150 may be a decentralized wireless ad hoc network (e.g., a wireless mess network) that does not rely on a preexisting infrastructure, such as routers, repeaters, or access points. Instead, each node may dynamically be added to, or removed from, the ad hoc network 150, without affecting the rest of nodes in communicating within the ad hoc network 150. Further, each node may participate in the routing by forwarding network messages to other nodes. Thus, by utilizing the network communication means described above, one node may be able to transmit a broadcasting message to all other nodes, or transmit a particular network message to a specific node, in the ad hoc network 150.

In some embodiments, the network 150 may be a centralized wireless network having routers, repeaters, or access points that can establish and manage the network 150. Depended on the network communication means utilized by the recording devices 141, 142, and 143, the network 150 may be, without limitation, a wireless local area network (WLAN), wireless Metropolitan area network (WMAN), or the like or any combination thereof. The network 150 may also be a wired network, such as phone line, local area network (LAN), wide area network (WAN), metropolitan area network (MAN), global area network such as the Internet, a Fibre Channel fabric, or any combination of such interconnects. To connect to a recording group that is implemented by a wired network 150, each of the recording devices 140, 141, and 142 may need to be physically plugged into the network 150.

In some embodiments, a recording group common server 120 may act as a third-party member of the recording group 130. The third-party member may be configured to facilitate the establishment of the recording group 130 for the other recording devices, so that the other recording devices may rely on the third-party member for managing the network communications in the recording group. The third-party member by itself may or may not generate any multimedia objects. For example, the recording group common server 120 may be dedicated to manage the network 150, and may be a wireless access point or router located near the recordable subject 110. After establishing the recording group 130, the recording group common server 120 may generate a group label for the recording group 130, and communicate with the recording devices that attempt to join the recording group 130.

In some embodiments, the first device (being a recording device or a recording group common server) that establishes the recording group 130 may generate a recording label for the recording group 130. Since the group label is generated at a specific time when the first device is positioned at a specific geographic location, the group label may correspond to the specific time and the specific geographic location for the recording group 130. The group label may then be distributed to other recording group members, and be stored along with the multimedia objects generated by the recording devices 140, 141, and 142. The details about generating a group label, establishing, joining, or leaving a recording group are further described below.

In some embodiments, upon joining the recording group 130 and receiving a group label, the recording devices 141, 142, and 143 may save the group label in, and/or associate the group label with, the multimedia objects generated by them. As a result, the multimedia objects are temporally and spatially correlated, since the group label effectively associates these multimedia objects that are generated at substantially the same time and same location. The group label makes the subsequent classification and retrieval of the multimedia content more efficient and convenient. Compared to the conventional technique of feature extraction and annotation of multimedia objects, correlation using group label is not based on the analysis of the multimedia contents, but accomplished by associating the multimedia contents with additional information (e.g., the group label, timestamp, and/or location information). As a result, the correlated multimedia objects may be retrieved and edited to generate a joint play, which may show multiple viewing angles of the same content and its surroundings, or have special effects such as switching among these multiple viewing angles.

Figure 2:
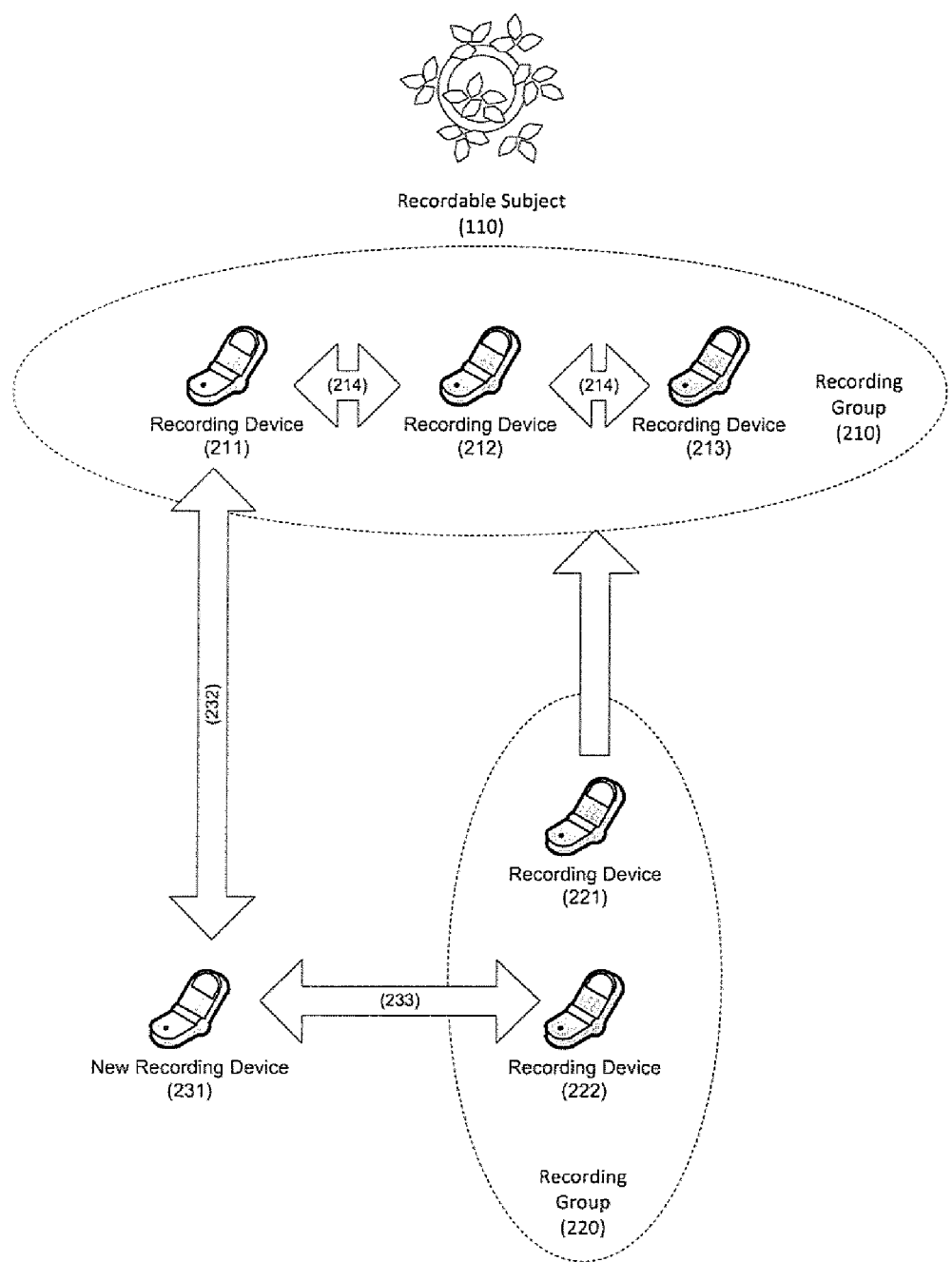
FIG. 2 shows an illustrative embodiment of an environment having one or more recording groups.

FIG. 2 shows an illustrative embodiment of an environment having one or more recording groups. When a new recording device 231 is operating at or near a recordable subject 110, it may turn on its network communication means (e.g., BLUETOOTH) to search for other recording devices nearby. If no other recording devices or a third-party member (e.g., a recording group common server) is found, the new recording device 231 may establish a recording group having itself as the first member. The new recording device 231 may then generate a group label for the just established recording group. If other recording devices and recording groups are available near the recordable subject 110, the new recording device 231 may decide to join one of the recording groups, and receive the group label from the joined recording group.

In some embodiments, the group label may contain a unique string for identifying the recording group and correlating the multimedia objects. The purpose of the unique string is to distinguish the different recording groups or multimedia objects generated at different time and locations. That is, multimedia objects with the same group label may be considered to be from the same recording group. The unique string may be formed by alphanumerical characters. To make the group label unique across the Internet, an already-unique value, such as the MAC address of the new recording device 231, or a Universally Unique Identifier (UUID), may be adopted as the whole or a part of the unique string. In some embodiments, the group label may be partly or wholly customized by the recording devices.

In some embodiments, the unique group label may be inherently associated with a specific time and a specific location. For example, the group label may be associated with the group label's creation time, which indicates that the recording group is in existence. The group label may also be associated with the location of recording device. Since the group label may be used to identify a recording group and/or be stored with multimedia devices, the specific time and the specific location may also be associated with the recording group and the multimedia devices. The specific time and the specific location are significant for the group label (as well as the recording group and the multimedia objects) because recording devices that join the recording group and receive the group label may be operating at or near the specific time and positioned at or near the specific location. Alternatively, the group label may be associated with other specific times (e.g., the starting time of a sport event), or other specific locations (e.g., the location of a tourist attraction point), as long as these times and locations may be spatially and temporally associated with the group label and the recording group.

In some embodiments, the specific time and the specific location may be stored along with the unique string in the group label. For example, the group label's unique string may be optionally appended with the specific time and/or the specific location (e.g., in geographic coordinate format). In some embodiments, the geographic coordinates may be obtained by a Global Positioning System (GPS) embedded in or attached with the new recording device 231. The specific location may also be obtained by a wireless Access Point (AP), a cell phone network base station, or a recording group common server. The specific time and the specific location may be extracted from the group label, and be used to search and retrieve multimedia objects that may be spatially and temporally related with the group label, but may be saved with a different group label. For example, for a group label that may indicate a specific time and a specific location, a search may seek to retrieve multimedia objects that have the same specific location, but are generated weeks or years before the specific time. Similarly, a different search may try to retrieve multimedia objects that are within a range of the specific time (e.g., 2 hours before and after the specific time), or within a certain distance away from the specific location (e.g., within 1 mile radius from the specific location).

In some embodiments, once a recording group is established, the group information required to operate the recording group may be maintained by one or more members of the recording group. Alternatively, each member of the recording group may maintain its own copy of the group information, and may synchronize its own copy with other members when there is a change to the group information. The group information may include, without limitation, recording group reference time, recording session, recording group size, group label existing time, group label lifetime, group size limitation, and group label grade.

In some embodiments, "group reference time" may refer to a unified reference time for the recording group, and may be used during the creating of the group label and the multimedia objects. Since some of the recording devices may not have a timer, or the times maintained by these recording devices may be different, it may be necessary to have a unified reference time for all the members of the recording group, to ensure an accurate temporal correlation. The group reference time may be first established by one member of the recording group (e.g., the recording group creator or a recording group common server), or at the same time and by the same member of the recording group that generates the group label. Then, the group reference time may be transmitted to any new member through a time-synchronization algorithm. That is, the new member may receive the group reference time by directly or indirectly communicating with the existing members that have the group reference time. After received the group reference time, each recording group's member may increment its own copy of the group reference time by the same or similar interval. The recording group's members may periodically perform time-synchronization to make sure that all members' group reference times remain identical. Further, the time-synchronization operation may also be accomplished along with the distribution of the group label among the recording devices.

In some embodiments, a "media timestamp" may refer to a timestamp indicating the creation of a multimedia object by one of the recording devices. When a member device of a recording group starts to create a specific multimedia object, the member device may generate a media timestamp for the specific multimedia object based on the group reference time, and store the media timestamp with the specific multimedia object. Afterward, the media timestamp may be used for comparing with the media timestamps of the multimedia objects created by other recording devices. Since the media timestamp corresponds to a synchronized group reference time, the creating sequences and the media timestamps of multiple multimedia objects may be meaningfully compared and utilized to generate a joint play.

In some embodiments, a "recording session" may refer to a course of recording for a specific recording device based on a specific amount of time or data. For example, a clip of audio or video recorded within a fixed amount of recording time, or a predetermined number of images, may be deemed a recording session. The recording session may be determined by the specific recording device based on its own configuration. Each recording device may maintain its own independent recording session. For the third-party member, its recording session may be permanent. Recording session may be useful in assigning the group label and/or media timestamp. For instance, multimedia objects generated in one recording session may use a specific media timestamp, and a subsequent recording session may use a more recent and up-to-date media timestamp.

In some embodiments, a "recording group size" may refer to the number of recording devices sharing the same recording group label at the same time. In other words, the recording group size refers to the number of recording devices in the recording group at a time. When a new member joins a recording group, a broadcasting message may be transmitted to all the existing members of the recording group, so that each member may increment the value of its copy of the recording group size by one. Similarly, when an existing member leaves the recording group, the recording group size for each of the remaining members may also be deducted by one. The "group label existing time" may refer to the total existence time of the recording group label in the recording group after which being generated by a device.

In some embodiments, to ensure that the recording group expands within control, a "group size limitation" and a "group label lifetime" may be defined. The group label lifetime indicates the maximum length of time for which new member may be allowed to join the recording group and the group label be allowed to distribute, starting from the time the group label is generated. The group size limitation refers to the maximum allowable number of the recording devices in a recording group. Both group label lifetime and group size limitation may be set to infinity, which means there is no restriction to the expansion of recording groups.

In some embodiments, for the third-party member, the group label lifetime may be set to infinity. In this case, the recording group that the third-party member belongs to may exist permanently, which means the recording devices and the multimedia objects generated by them may be correlated spatially as long as they have been adjacent to the third-party member, even though the recording devices may not be recording at the same time. The third-party member may also be fixed at a certain geographic location. In this case, the third-party member may use the geographic location to correlate the multimedia objects created by the recording devices which have been at or adjacent to the geographic location. Group label lifetime and group size limitation may also be customized per recording device, or be identical for all members of a recording group. When a recording group existed for more than the group label lifetime, or when the corresponding recording group's group size is equal to or greater than the group size limitation, new recording device may not be allowed to join the recording group.

In some embodiments, a "group label grade" (also referred to as "label grade") may be set for a specific recording group, and be used for comparing with the label grades of the other recording groups. In operation, the recording groups with a higher label grade may expand toward the recording groups with lower label grades. That is, the recording devices that belong to a low-label-grade recording group may leave the low-label-grade recording group and join a high-label-grade recording group. When a third-party member establishes a recording group, the recording group may have a high or the highest label grade. Such an approach may allow new recording devices that are not in any recording group, or recording devices that belong to a recording group that has no third-party member, to join the recording group with the third-party member.

In summary, in a recording session, a recording device may need to maintain at least a group label. The recording device may also optionally maintain some or all of the following group information, such as, without limitation, group label grade, group size, recording group reference time, group label existing time, group label lifetime, and/or group size limitation. Further, the above group information may also be stored in the multimedia objects along with the group label.

In some embodiments, the new recording device 231 may detect one or more recording groups already in existence within the range of its network communication means. For example, the new recording device 231 may detect the existence of one or more recording devices (e.g., a recording device 211), and inquire (232) whether the recording device 211 belongs to any recording group. If the recording device 211 responds (232) with an answer yes, the new recording device 231 may determine to join the recording group 210 (which the recording device 211 is an existing member) by communicating with the recording device 211. Upon approval of the new recording device 231's join request, the recording device 211 may then transmit (232) the group label for the recording group 210 to the new recording device 231. Afterward, the new recording device 231 may start using the received group label for generating the multimedia objects.

In some embodiments, if the recording device 211 determines that the group size limitation or the group label lifetime is reached, the recording device 211 may reject the new recording device 231's join request. In this case, the new recording device 231 may either inquire other recording devices nearby and request to join the other recording groups, or determine to establish a new recording group by itself.

In some embodiments, after the new recording device 231 is added to the recording group 210, the recording device 211 may transmit additional group information (as described above) to the new recording device 231. Further, a status message may be broadcasted (214) among the existing recording devices (e.g., the recording devices 211, 212, and 213) in the recording group 210, using ad hoc network communication mechanisms. Afterward, all the already existing member recording devices are aware of the new member and update their self-maintained group information. Thus, by communicating with one member of the recording group, it may be sufficient for the new recording device 231 to join the recording group 210.

In some embodiments, when the new recording device 231 transmits a join request, it may receive more than one response from the recording devices that received the join request. The new recording device 231 may evaluate these responses, and determine how many recording groups are in existence nearby. If all the responses belong to the same recording group, the new recording device 231 may select one of the responding recording devices for further communication.

In some embodiments, the responses (232 & 233) received by the new recording device 231 may indicate that there are several recording groups (e.g., the recording groups 210 and 220) within the reach of the new recording device 231's network communication means. In this case, the new recording device 231 may evaluate some of the group information included in the responses, and determine which recording group to join. For example, by evaluating the current group size, group size limitation, and/or the group label lifetime of the existing recording groups 210 and 220, the new recording device 231 may determine to join the one having a larger group size, which in FIG. 2's example, is the recording group 210. The details of joining and leaving a recording group are further described below.

In some embodiments, a recording device in an existing recording group may leave the existing recording group and join another recording group. For example, a recording device 221 may be a member of the recording group 220. The recording device 221 may continuously discover other recording devices nearby. Upon determining that another recording group 210 may exist and have a group size (e.g., 3) that is larger than its own group's group size (e.g., 2), the recording device 221 may leave the recording group 220 and join the recording group 210. As a result, the recording device 221 may obtain the recording group 210's group label, and start to use the new group label during the generating of the multimedia objects. Such an approach may allow more multimedia objects to be correlated, while reducing the number of recording groups near the recordable subject 110.

In some embodiments, the recording device 221 may also preserve the old group label for the previous recording group 220. In other words, the recording device 221 may keep at the same time two group labels, one from the recording group 210 and another from the recording group 220. Both group labels may be stored in the multimedia objects. Thus, the multimedia objects created by the recording device 221 may be correlated with two groups of multimedia objects.

In some embodiments, the recording devices may also generate private recording group labels based on their own criteria. A private recording group label (or "private group label"), which may contain the device information or user information associated with the recording device, may be utilized for maintaining privacy of or encrypting the multimedia objects. Comparing to a regular group label, the private recording group label may not be distributed to other recording devices in the recording group. Further, a private recording group label may incorporate or correspond to a regular group label, so that when needed, the regular group label may be extracted or derived from the private recording group label.

Figure 3:
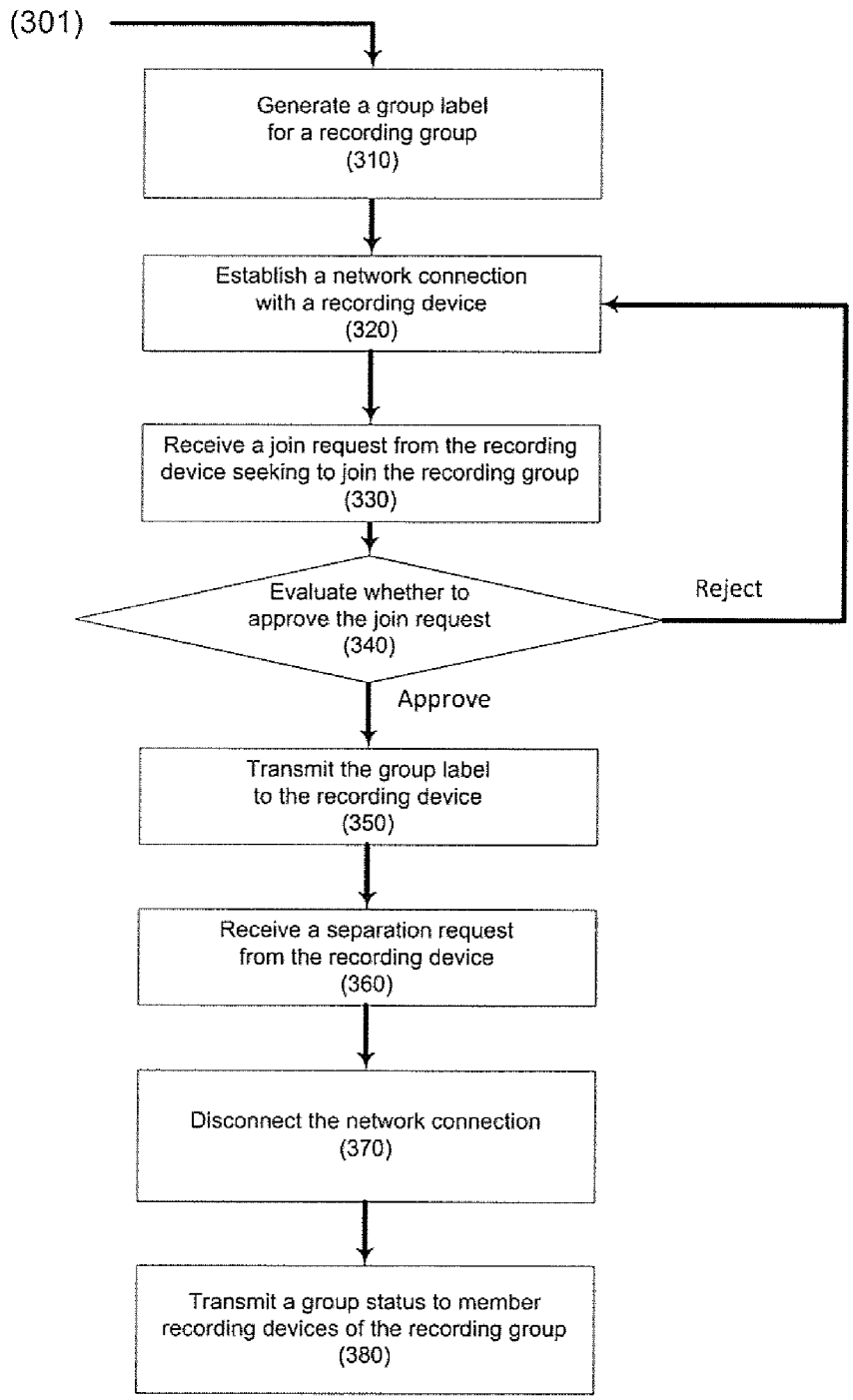
FIG. 3 shows a flow diagram of an illustrative embodiment of a process for processing join and separation requests by an existing member of a recording group.

FIG. 3 shows a flow diagram of an illustrative embodiment of a process 301 for processing join and separation requests by an existing member of a recording group. The process 301 sets forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 3 may be practiced in various implementations. In some embodiments, machine-executable instructions for the process 301 may be stored in memory, executed by a processor, and/or implemented in a recording device or a recording group common server, as illustrated in FIG. 1.

At block 310, a recording device or a recording group common server (hereinafter "a group creator") may determine to establish a recording group (hereinafter "first group"). The group creator may then generate a group label for the first group. In some embodiments, the group label may uniquely identify the first group, and may correspond to a specific time and a specific geographic location for the first group. Further, the group label may contain a unique string, and contain optionally the specific time and the specific geographic location. For the newly created first group, the group creator may initialize the following group information: the group label existing time may be set to 0 and start to accumulate; the recording group reference time may be set to the local time; the recording group size may be set to 1; the group label grade may be set to a value based on the type of the recording device; when the group creator is a recording group common server, the group label grade may be set to the highest; and the group size limitation and the group label lifetime may also be set according to predetermined values.

At block 320, the group creator or any other existing member of the first group (hereinafter an "existing member") may listen to connection requests from other devices, or periodically communicate with the other existing members for time and group information synchronization. In some embodiments, the existing member may receive a network connection request from a recording device (hereinafter a "new member") via a wired/wireless network communication means (e.g., BLUETOOTH). In response to the network connection request, the existing member may establish a network connection with the new member (e.g., setting up a BLUETOOTH connection), so that additional information may be exchanged through the network connection. At block 330, the existing member may receive a join request from the recording device seeking to join the first group. The join request may also include the relevant group information if the new member already belongs to one or more recording groups.

At block 340, the existing member may then evaluate the group information that it maintains, and determine for the first group whether to approve the new member's join request. In some embodiments, the new member's join request may indicate that the new member does not belong to any other recording group. In this case, the existing member may evaluate the first group's group size and group size limitation. If the addition of the new member would not exceed the group size limitation for the first group, the new member may be acceptable. The existing member may further evaluate the group label lifetime, and determine whether the current group reference time already passes the group label lifetime. If already passed, then the new member may not be added. Otherwise, the new member is eligible for the first group. If the new member's join request is approved, the process 301 may proceed to block 350. Otherwise, the existing member may reject the join request. The process 301 may proceed to block 320, and wait for new network connection requests.

In some embodiments, the new member's join request may indicate that the new member already belongs to one or more recording groups (hereinafter "second groups"). In this case, the join request may contain additional group information for the second groups, such as label grades and group sizes. First, the group labels of the new member's second groups are compared with the first group's group label. If a match is found, then the new member may already be in the same recording group as the existing member. In this case, the existing member may reject the new member's join request. If there is no match found, then the existing member may compare the label grade of the first group with the label grades of the second groups. If the label grade of the first group is higher than or equivalent to the label grades of the second groups, then the new member may be allowed to join the first group. If the label grade of the first group is lower than the second groups' label grades, then the existing member may determine to leave the first group and join one or more of the second groups the new member belongs to.

After finished evaluating the label grade, the existing member may evaluate its group size (i.e., the group size of the first group) with the new member's group sizes (i.e., the group sizes of the second groups), and determine which recording group has a bigger group size. If the new member's group size is smaller, then the existing member may accept the new member, pending the satisfactions of the group size limitation and group label lifetime. Otherwise, the existing member may determine to join the new member's recording group. Whenever the existing member determines to join the new member's recording group, it may reject the new member's join request. In some embodiments, the existing member may determine for the first group whether to approve the new member's join request based on the configuration stored in the existing member, and/or the choice selected by a user of existing member.

At block 350, the existing member may transmit the group label of the first group to the new member. The new member may then generate multimedia objects using the group label. Further, the existing member may synchronize the group reference time with the new member, and transmit additional group information, such as group size limitation, group label life time, group label existing time, and/or label grade to the new member. Afterward, the new member may be responsible for maintaining and updating the group information. In some embodiments, the existing member may increment its self-maintained group size by one. Optionally, the existing member may also broadcast a join status message to the other existing members of the recording group, so that they may update their own group information similarly.

At block 360, the existing member (hereinafter the "first existing member") may receive a separation request from a second existing member of the recording group. In this case, the second existing member may have finished its recording operation, or may seek to join other recording groups. At block 370, upon receiving the separation request, the first existing member may deduct its self-maintained group size by one, and disconnect the network connection with the second existing member. Afterward, the disconnected recording device may no longer be deemed a member of the recording group. Unless the disconnected recording device seeks to rejoin the current recording group, no further communication may be conducted between the members of the first group and the disconnected recording device.

At block 380, the existing member may transmit a group status message to the remaining members of the recording group informing the separation of previously the second existing member, which is no longer in the first group. After receiving the group status message, either directly or via another member, each of the remaining members may update its own group information. For example, each may deduct the group size it maintains by one. In some embodiments, a recording device may be separated from the recording group without having an opportunity to transmit a separation request. In this case, the existing members may periodically perform a scanning of the recording group, and identify the existing members. If one or more members are missing, then the group status message may be transmitted to the remaining members, informing them the accurate current status of the recording group.

Figure 4:
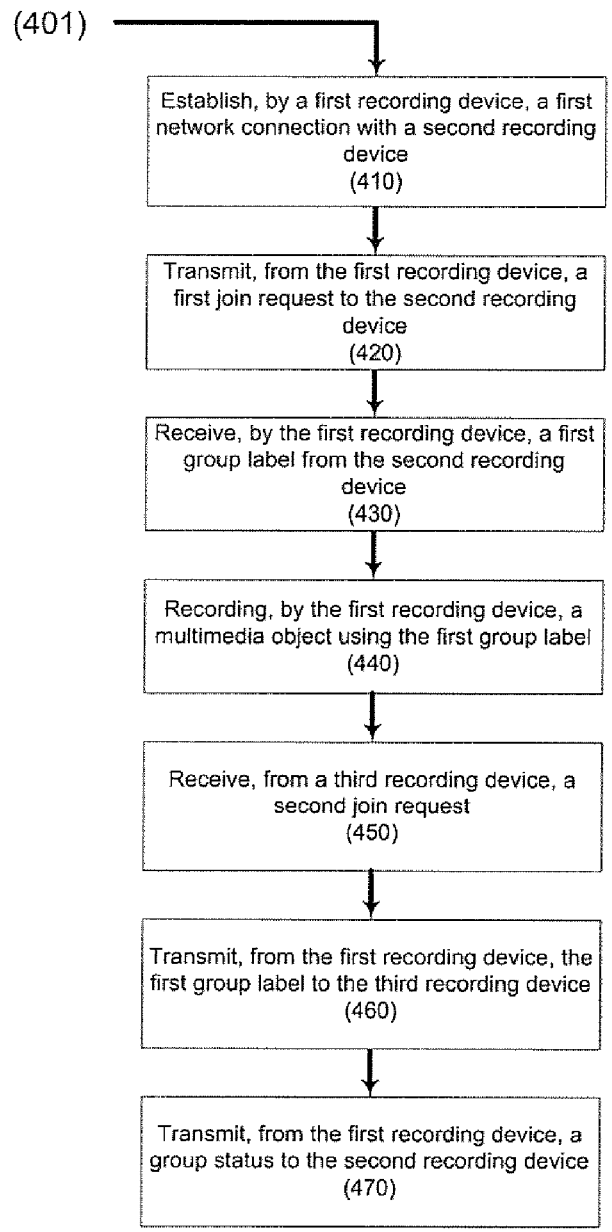
FIG. 4 shows a flow diagram of an illustrative embodiment of a process for joining a recording group by a recording device.

FIG. 4 shows a flow diagram of an illustrative embodiment of a process 401 for joining a recording group by a recording device. The process 401 sets forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 4 may be practiced in various implementations. In some embodiments, machine-executable instructions for the process 401 may be stored in memory, executed by a processor, and/or implemented in a recording device or a recording group common server, as illustrated in FIG. 1.

At block 410, a first recording device may establish a network connection with a second recording device via a wired/wireless network communication means. At block 420, the first recording device may transmit a first join request to the second recording device, seeking to join the first recording group, which the second recording device belongs to. In some embodiments, the first recording device is not a member of any recording group. Alternatively, the first recording device may already be a member of its recording group, and determine to leave its recording group and join the first recording group.

At block 430, the first recording device may receive a first group label from the second recording device. The first group label may be associated with the first recording group. In this case, the second recording device may have determined that the first recording device is eligible for the joining, based on the group size, group size limitation, group label lifetime, and/or label grade evaluations, as illustrated above. The first recording device may optionally receive from the second recording device additional group information for the first recording group.

At block 440, the first recording device may generate a multimedia object and store the first group label with the multimedia object. In some embodiments, the first group label may be stored in the metadata fields of the multimedia object. Further, the first recording device may define a recording session, and use the first group label during the recording session. Afterward, the multimedia object may be uploaded to the Internet, and a user may extract the first group label from the multimedia object, and use the first group label to search for any other multimedia objects that are temporal and spatial correlated with the multimedia object.

At block 450, after becoming a member of the first recording group, the first recording device may receive a second join request from a third recording device. At block 460, the first recording device may transmit the first group label to the third recording device. Further, the first recording device may transmit a set of group information to the third recording device, and make update to the self-maintained group information. At block 470, the first recording device may transmit a group status to the second recording device, as well as any other recording devices that are members of the recording group, informing them the newly added third recording device into the recording group.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Moreover, one or more of the outlined steps and operations may be performed in parallel.

Figure 5:
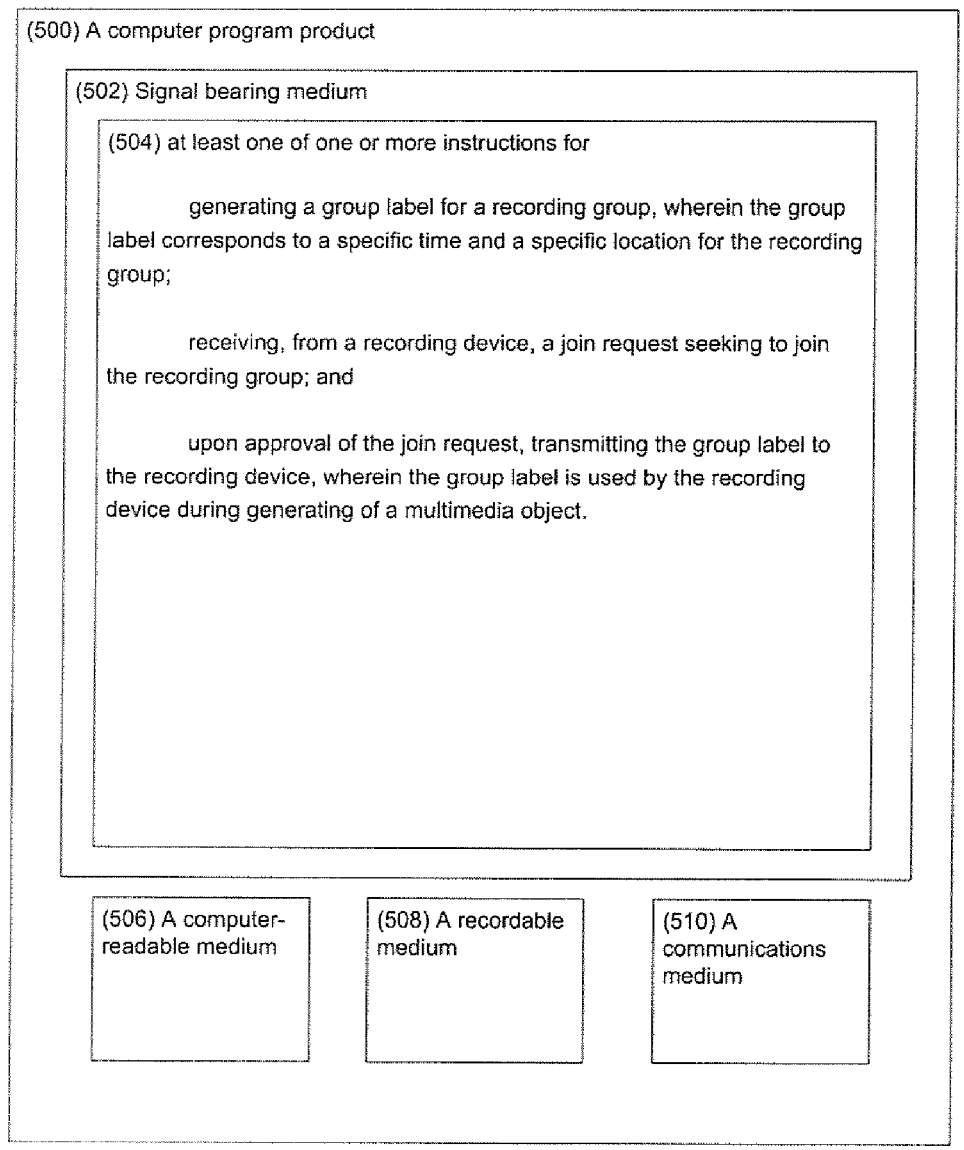
FIG. 5 shows an illustrative embodiment of an example computer program product arranged in accordance with the present disclosure.

FIG. 5 is a block diagram of an illustrative embodiment of a computer program product 500 for implementing a method for correlating multimedia objects by a recording device or a recording group common server. Computer program product 500 may include a signal bearing medium 502. Signal bearing medium 502 may include one or more sets of executable instructions 504 that, when executed by, for example, a processor, may provide the functionality described above. Thus, for example, the recording devices or the recording group common server of FIG. 1 may undertake one or more of the operations shown in at least FIG. 3 or FIG. 4 in response to instructions 504 conveyed by signal bearing medium 502.

In some implementations, signal bearing medium 502 may encompass a non-transitory computer readable medium 506, such as, but not limited to, a hard disk drive, a Compact Disc (CD), a Digital Versatile Disk (DVD), a digital tape, memory, etc. In some implementations, signal bearing medium 502 may encompass a recordable medium 508, such as, but not limited to, memory, read/write (R/W) CDs, RAM DVDs, etc. In some implementations, signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, referring to FIG. 1, computer program product 500 may be conveyed to the recording devices and the recording group common server by signal bearing medium 502, where signal bearing medium 502 is conveyed by a wireless communications medium 510 (e.g., a wireless communications medium conforming with the IEEE 802.11 standard). Computer program product 500 may be recorded on non-transitory computer readable medium 506 or another similar recordable medium 508.

Figure 6:
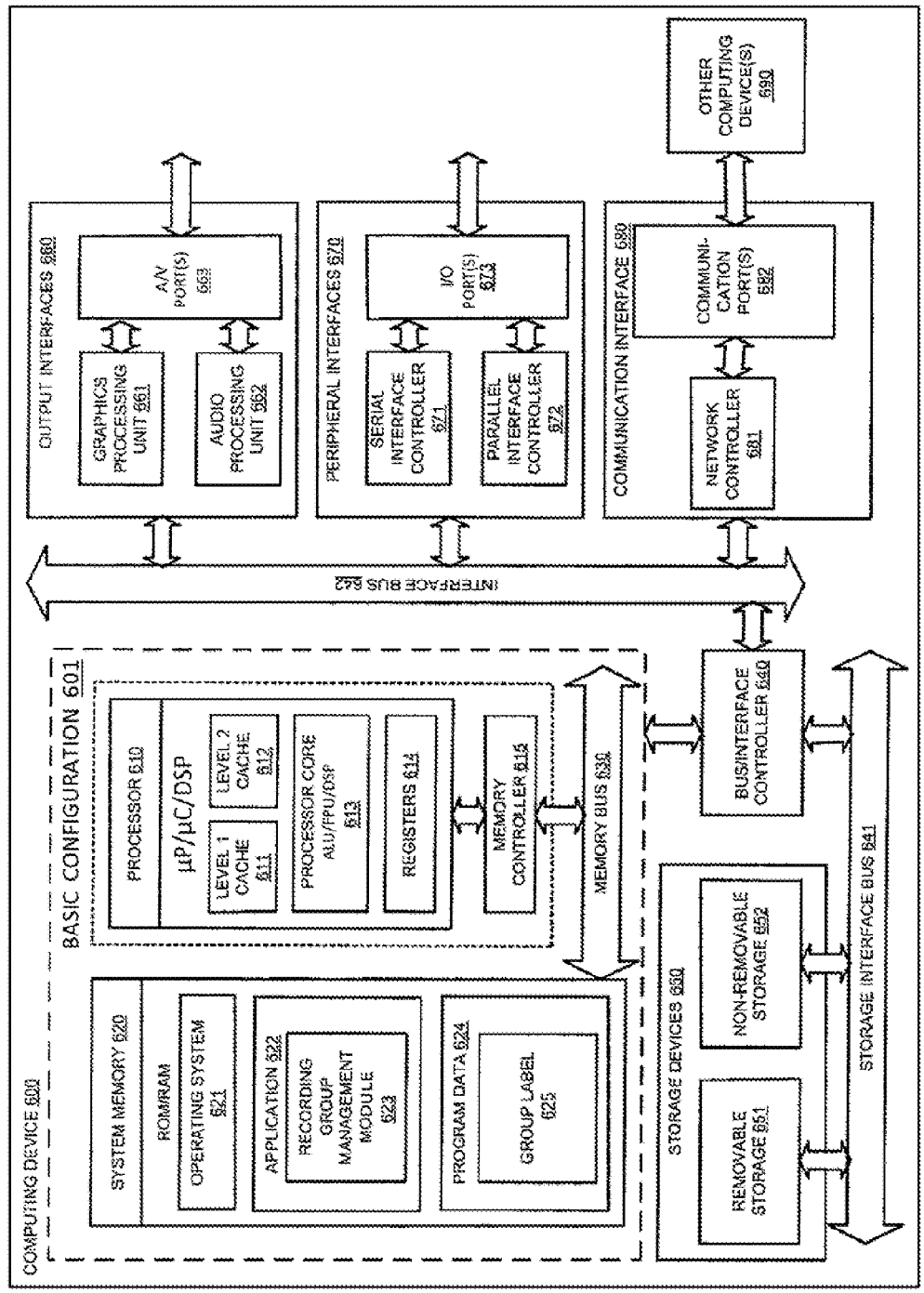
FIG. 6 shows a block diagram of an illustrative embodiment of an example computing device that can be arranged as a recording device or a recording group common server for use in accordance with the present disclosure.

FIG. 6 shows a block diagram of an illustrative embodiment of an example computing device 600 that can be arranged as a recording device or a recording group common server for use in accordance with the present disclosure. In a very basic configuration 601, computing device 600 may include one or more processors 610 and a system memory 620. A memory bus 630 may be used for communicating between the processor 610 and the system memory 620.

Depending on the desired configuration, processor 610 may be of any type including but not limited to a microprocessor (µP), a microcontroller (µC), a digital signal processor (DSP), or any combination thereof. Processor 610 can include one or more levels of caching, such as a level one cache 611 and a level two cache 612, a processor core 613, and registers 614. The processor core 613 can include an arithmetic logic unit (ALU), a floating point unit (FPU), a digital signal processing core (DSP Core), or any combination thereof. A memory controller 615 can also be used with the processor 610, or in some implementations the memory controller 615 can be an internal part of the processor 610.

Depending on the desired configuration, the system memory 620 may be of any type including but not limited to volatile memory (such as RAM), non-volatile memory (such as ROM, flash memory) or any combination thereof. System memory 620 may include an operating system 621, one or more applications 622, and program data 624. Application 622 may include a recording group management module 623 that is arranged to perform the functions and/or operations as described herein including at least the functional blocks and/or operations described with respect to process 301 of FIG. 3 and process 401 of FIG. 4. Program Data 624 may include group label 625 generated by the recording group management module 623. In some example embodiments, application 622 may be arranged to operate with program data 624 on an operating system 621 such that implementations of the recording group management may be provided as described herein. This described basic configuration is illustrated in FIG. 6 by those components within dashed line 601.

Computing device 600 may have additional features or functionality, and additional interfaces to facilitate communications between the basic configuration 601 and any required devices and interfaces. For example, a bus/interface controller 640 may be used to facilitate communications between the basic configuration 601 and one or more data storage devices 650 via a storage interface bus 641. The data storage devices 650 may be removable storage devices 651, non-removable storage devices 652, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 620, removable storage 651 and non-removable storage 652 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of device 600.

Computing device 600 may also include an interface bus 642 for facilitating communication from various interface devices (e.g., output interfaces, peripheral interfaces, and communication interfaces) to the basic configuration 601 via the bus/interface controller 640. Example output interfaces 660 may include a graphics processing unit 661 and an audio processing unit 662, which may be configured to communicate to various external devices such as a display or speakers via one or more A/V ports 663. Example peripheral interfaces 670 may include a serial interface controller 671 or a parallel interface controller 672, which may be configured to communicate with external devices such as input devices (e.g., keyboard, mouse, pen, voice input device, touch input device) or other peripheral devices (e.g., printer, scanner) via one or more I/O ports 673. An example communication interface 680 includes a network controller 681, which may be arranged to facilitate communications with one or more other computing devices 690 over a network communication link via one or more communication ports 682.

The network communication link may be one example of a communication media. Communication media may typically be embodied by computer readable instructions, data structures, program modules, or other transport mechanism, and may include any information delivery media. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a film or digital camera, a camcorder, a personal media player device, a wireless web-watch device, a personal headset device, an application specific device, or a hybrid device that includes any of the above functions. Computing device 600 may also be implemented as a personal computer including both laptop computer and non-laptop computer configurations. In addition, computing device 600 may be implemented as part of a wireless base station or other wireless system or device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory; and a transmission type medium such as a digital and/or an analog communication medium (e.g., a fiber optic cable, a waveguide, a wired communications link, a wireless communication link).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to"). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method for correlating multimedia objects with a plurality of recording devices, comprising:
   generating a group label for a recording group that includes at least some of the plurality of recording devices, wherein the group label corresponds to a specific time and a specific location for the recording group;
   receiving, from a recording device, a join request seeking to join the recording group;
   evaluating the join request based on a first label grade comprised in the join request and associated with the recording device; and
   transmitting the group label to the recording device in response to the first label grade is lower than a second label grade associated with the recording group, wherein the group label is used by the recording device during generation of a multimedia object corresponding to the specific time and the specific location after the recording device receives the group label.

2. The method as recited in claim 1, further comprising:
   establishing a network connection with the recording device, wherein the join request and the group label are communicated via the network connection.

3. The method as recited in claim 2, further comprising:
   receiving, from the recording device, a separation request seeking to separate from the recording group; and
   disconnecting the network connection with the recording device.

4. The method as recited in claim 2, further comprising:
   maintaining communications among the plurality of recording devices via the network connection, wherein the plurality of recording devices belong to the recording group; and
   upon approval of the join request, transmitting a first group status indicative of the recording device joining the recording group to each of the plurality of recording devices via the network connection.

5. The method as recited in claim 2, further comprising:
   upon receiving a separation request from the recording device, transmitting a second group status indicative of the recording device leaving the recording group to each of the plurality of recording devices via the network connection.

6. The method as recited in claim 1, wherein the group label specifies a temporal correlation and a spatial correlation among the multimedia objects created by the plurality of recording devices belonging to the recording group.

7. The method as recited in claim 1, wherein the approval of the join request comprises:
   determining adding the recording device to the recording group satisfies a group size limit and a time limit associated with the recording group, wherein the group size limit corresponds to an allowable number of recording devices that can join the recording group, and the time limit corresponds to an allowable length of time within which a recording device can join the recording group.

8. The method as recited in claim 1, wherein the specific location is provided by a Global Positioning System (GPS) device.

9. A method for correlating multimedia objects with a plurality of recording devices, comprising:
   establishing, by a first recording device, a first network connection with a second recording device;
   transmitting, by the first recording device, a first join request to the second recording device via the first network connection seeking to join a first recording group, wherein the first loin request comprises a first label grade associated with the first recording device;
   in response to the first label grade is lower than a second label grade associated with the second recording device, receiving, by the first recording device, a first group label from the second recording device after the second record device approves the first join request based on group information associated with the first recording group, wherein the first group label identifies the first recording group and corresponds to a specific time and a specific location associated with the second recording device; and
   after receiving the first group label, generating, by the first recording device, a multimedia object corresponding to the specific time and the specific location using the first group label.

10. The method as recited in claim 9, further comprising:
    detecting a second network connection with a third recording device;
    transmitting, from the first recording device, a second join request to the third recording device via the second network connection seeking to join a second recording group;
    receiving, by the first recording device, a second group label from the third recording device, wherein the second group label identifies the second recording group and corresponds to another specific time and another specific location associated with the third recording device; and
    generating, by the first recording device, the multimedia object using the second group label.

11. The method as recited in claim 9, further comprising:
separating, by the first recording device, from the first recording group by transmitting a separation request to the second recording device via the first network connection.

12. The method as recited in claim 9, further comprising:
receiving, by the first recording device, a group status indicative of a number of recording devices belonging to the first recording group from the second recording device.

13. The method as recited in claim 9, further comprising:
receiving, by the first recording device, a third join request from a fourth recording device seeking to join the first recording group; and
transmitting, by the first recording device, the first group label to the fourth recording device.

14. The method as recited in claim 13, further comprising:
transmitting, by the first recording device, a group status indicative of a number of recording devices belonging to the first recording group to the second recording device.

15. A non-transitory machine-readable medium having a set of instructions which, in response to execution by a processor, cause the processor to perform a method for correlating multimedia objects with a plurality of recording devices, the method comprising:
generating a group label for a recording group that includes at least some of the plurality of recording devices, wherein the group label corresponds to a specific time and a specific location for the recording group;
receiving, from a recording device, a join request seeking to join the recording group;
evaluating the loin request based on a first label grade comprised in the loin request and associated with the recording device; and
transmitting the group label to the recording device in response to the first label grade is lower than a second label grade associated with the recording group, wherein the group label is used by the recording device during generation of a multimedia object corresponding to the specific time and the specific location after the recording device receives the group label.

16. The non-transitory machine-readable medium as recited in claim 15, wherein the approval of the join request comprises:
determining adding the recording device to the recording group satisfies a predetermined group limit and a time limit associated with the recording group.

17. A non-transitory machine-readable medium having a set of instructions which, in response to execution by a processor of a first recording device, cause the processor to perform a method for correlating multimedia objects with a plurality of recording devices, the method comprising:
establishing a first network connection with a second recording device;
transmitting a first join request to the second recording device via the first network connection seeking to join a first recording group, wherein the first loin request comprises a first label grade associated with the first recording device;
in response to the first label grade is lower than a second label grade associated with the second recording device, receiving a first group label from the second recording device after the second record device approves the first join request based on group information associated with the first recording group, wherein the first group label identifies the first recording group and corresponds to a specific time and a specific location associated with the second recording device; and
after receiving the first group label, generating a multimedia object corresponding to the specific time and the specific location using the first group label.

18. The non-transitory machine-readable medium as recited in claim 17, further comprising:
detecting a second network connection with a third recording device, wherein the third recording device belongs to a second recording group;
receiving, from the third recording device, a first group size of the second recording group; and
upon a determination that the first group size of the second recording group is larger than a second group size of the first recording group, transmitting a second join request to the third recording device via the second network connection seeking to join the second recording group.

19. The non-transitory machine-readable medium as recited in claim 17, further comprising:
detecting a second network connection with a third recording device, wherein the third recording device belongs to a second recording group;
receiving, from the third recording device, a first label grade of the second recording group; and
upon a determination that the first label grade of the second recording group is higher than a second label grade of the first recording group, transmitting a second join request to the third recording device via the second network connection seeking to join the second recording group.

20. The non-transitory machine-readable medium as recited in claim 19, further comprising:
receiving a second group label from the third recording device, wherein the second group label identifies the second recording group and corresponds to another specific time and another specific location associated with the third recording device; and
separating from the first recording group by transmitting a separation request to the second recording device via the first network connection.

* * * * *

UNITED STATES PATENT AND TRADEMARK OFFICE
CERTIFICATE OF CORRECTION

PATENT NO.         : 9,210,393 B2
APPLICATION NO.    : 13/701833
DATED              : December 8, 2015
INVENTOR(S)        : Chen Page 1 of 1

It is certified that error appears in the above-identified patent and that said Letters Patent is hereby corrected as shown below:

In the specification

Column 1, Line 50, delete "at feast" and insert -- at least --, therefor.

Column 12, Line 7, delete "fight" and insert -- light --, therefor.

Column 13, Line 19, delete "RAM" and insert -- R\W --, therefor.

In the claims

Column 18, Line 36, Claim 9, delete "loin" and insert -- join --, therefor.

Column 19, Line 32, Claim 15, delete "loin" and insert -- join --, therefor.

Column 19, Line 33, Claim 15, delete "loin" and insert -- join --, therefor.

Column 20, Line 3, Claim 17, delete "loin" and insert -- join --, therefor.

Signed and Sealed this
Twenty-ninth Day of March, 2016

Michelle K. Lee
*Director of the United States Patent and Trademark Office*